US006826639B2

(12) United States Patent
Pasumansky et al.

(10) Patent No.: US 6,826,639 B2
(45) Date of Patent: Nov. 30, 2004

(54) HIERARCHICAL DISPLAY OF MULTILEVEL PROTOCOL FOR COMMUNICATION DATA

(75) Inventors: Michael Pasumansky, San Jose, CA (US); Peretz Tzarnotsky, Palo Alto, CA (US); Valera Fooksman, San Jose, CA (US)

(73) Assignee: Computer Access Technology Corporation, Santa Clara, CA (US)

( * ) Notice: Subject to any disclaimer, the term of this patent is extended or adjusted under 35 U.S.C. 154(b) by 497 days.

(21) Appl. No.: 09/916,481

(22) Filed: Jul. 27, 2001

(65) Prior Publication Data

US 2003/0028693 A1 Feb. 6, 2003

(51) Int. Cl.[7] .............................................. G06F 13/42
(52) U.S. Cl. ...................... 710/105; 710/315; 714/39; 345/810; 345/841; 345/843; 345/853
(58) Field of Search .......................... 714/39; 710/105, 710/315; 345/810, 853, 841, 843

(56) References Cited

U.S. PATENT DOCUMENTS

| | | | | |
|---|---|---|---|---|
| 3,826,908 A | * | 7/1974 | Weathers et al. | 714/39 |
| 5,287,506 A | * | 2/1994 | Whiteside | 714/39 |
| 5,347,524 A | * | 9/1994 | I'Anson et al. | 714/39 |
| 5,819,027 A | * | 10/1998 | Budelman et al. | 714/47 |
| 5,850,386 A | * | 12/1998 | Anderson et al. | 370/241 |
| 5,850,388 A | * | 12/1998 | Anderson et al. | 370/252 |
| 6,122,757 A | * | 9/2000 | Kelley | 714/39 |
| 6,148,420 A | * | 11/2000 | Schlater et al. | 714/39 |
| 6,202,103 B1 | * | 3/2001 | Vonbank et al. | 710/15 |
| 6,219,050 B1 | * | 4/2001 | Schaffer | 345/853 |
| 6,584,501 B1 | * | 6/2003 | Cartsonis et al. | 709/224 |
| 6,587,439 B1 | * | 7/2003 | Arcieri et al. | 370/252 |
| 6,639,607 B1 | * | 10/2003 | Ferguson et al. | 345/734 |
| 6,651,099 B1 | * | 11/2003 | Dietz et al. | 709/224 |
| 6,687,750 B1 | * | 2/2004 | Messinger et al. | 709/224 |
| 2002/0004829 A1 | * | 1/2002 | Yasunami | 709/224 |
| 2002/0049930 A1 | * | 4/2002 | Hannigan | 714/39 |
| 2002/0147943 A1 | * | 10/2002 | Slaugh et al. | 714/39 |
| 2003/0131098 A1 | * | 7/2003 | Huntington et al. | 709/224 |
| 2003/0135525 A1 | * | 7/2003 | Huntington et al. | 707/501.1 |
| 2003/0135612 A1 | * | 7/2003 | Huntington et al. | 709/224 |

OTHER PUBLICATIONS

Honda, Yoshiyuki, et al., "Protocol Analyzer for Home Bus System (HBS), " Aug. 1990, IEEE Transactions on Consumer Electronics, vol. 36, Issue 3, p. 586–592.*

Zinky, John A., et al., "Visualizing Packet Traces," 1992, ACM Press, P. 293–304.*

Tsukamoto, K., et al., "A Study of Protocol Analysis for Packet Switched Network," 1981 ACM Press, p. 108–117.*

* cited by examiner

*Primary Examiner*—Xuan M. Thai
*Assistant Examiner*—Donna K. Mason
(74) *Attorney, Agent, or Firm*—David R. Gildea

(57) ABSTRACT

A hierarchical display of protocol layers for communication data. Fields of the communication data are converted into field cells where each field cell has a text field and a field descriptor. The field cells for each protocol layer are arranged by an interpreter into protocol units according to a protocol standard for that layer and then displayed in a hierarchical manner. Detailed specifications for field cells taken directly from the protocol standard can be displayed by using a cursor over the field cell. Indicators in particular ones of the field cells allow certain field cells within a protocol unit to be collapsed or expanded within the protocol unit or allow lower protocol units to be collapsed or expanded into the higher protocol units.

24 Claims, 12 Drawing Sheets

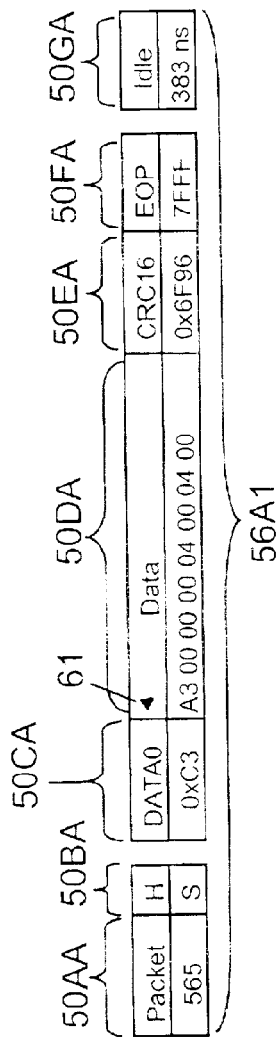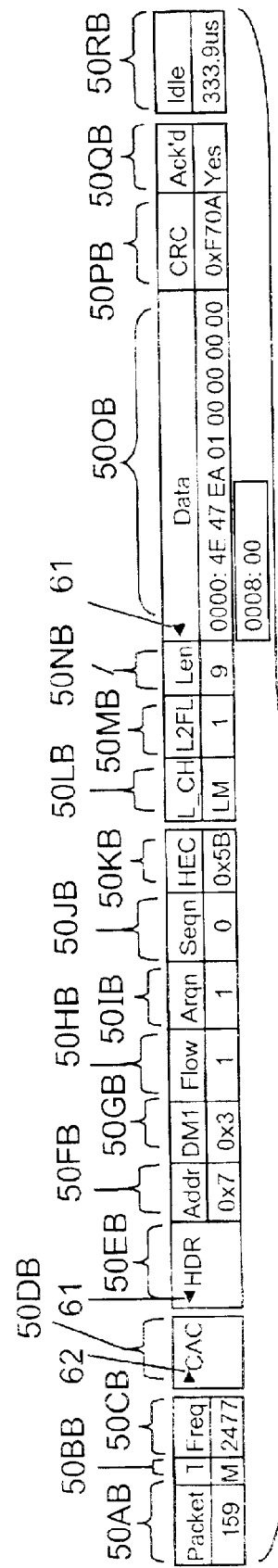

HIERARCHICAL DISPLAY OF MULTILEVEL PROTOCOL FOR COMMUNICATION DATA

BACKGROUND OF THE INVENTION

1. Field of the Invention

The invention relates generally to protocol analysis and more particularly to methods and apparatus for a hierarchical display of protocol units for a multilevel protocol.

2. Description of the Prior Art

Digital devices communicate by sending electronic signals through a physical transmission channel according to a specified protocol. The protocol describes the manner in which the signals are sent and defines the detailed rules that govern both the channel and the device hardware and software. The channel and the protocol are both typically specified by a formal communication protocol specification. For transmissions to be successful, each device must recognize and follow the same specification.

Most recent protocol standards are based on packets. This means that data is transmitted in discrete packets instead of continuously. A packet is defined as a discrete quantity of data organized into a bundle for transmission. Packets typically contain three elements: control information (e.g., source, destination, and length), the data to be transferred, and error detection and correction information. Typically, several types of packets are defined in the protocol standard. Each packet type carries data segmented into fields. Each of the fields has a certain location in the packet defined in the protocol standard for showing the type of packet, routing information, data for an application, error checking, and the like.

Modern protocol standards typically include several layers that may be thought of in a hierarchy. The lowest protocol layer is the packet protocol. The packet protocol defines the fields for an individual packet. Higher level protocols are layered on top of the packet protocol to allow bi-directional communication of individual packets between the host (master) and a device, or between any two devices. Still higher protocols are used for transferring application data or mapping between different protocol standards.

Three exemplary protocol standards are Universal Serial Bus (USB), InfiniBand™, and BLUETOOTH™.

The USB protocol, enables low and medium speed connectivity between computers and peripheral devices, including keyboards, mice, printers, scanners, joysticks and cameras using plug and play technology through copper wires at speeds of up to twelve megabits per second (Mbps) over distances of up to five meters. This speed increases to up to 480 Mbps in USB 2.0, released in April 2000. The USB protocol was introduced in 1995 and replaces several of the protocols used previously over serial, parallel, mouse and keyboard ports. The USB 2.0 specification USB allows device operation at one of three speeds: low speed (1.5 Mbps), full speed (12 Mbps), and high speed (480 Mbps). Low and full speed co-existed in an original USB 1.1 specification, and they still exist in the USB 2.0 specification. The USB 2.0 refers to low and full speed together as "classic" speeds.

There are four layers within the USB protocol—packets, transactions, split transactions, and transfers. Data on a bus is transmitted in sets of base protocol units called packets. The USB specification defines 16 different types of packets that can be sent on the bus. Each packet starts with a packet identifier (PID) field that identifies the packet type. The rest of the packet fields follow. Most bus transactions involve the transmission of up to three packets. Each transaction begins when a host controller, on a scheduled basis, sends a USB packet describing the type and direction of a transaction, a USB device address, and an endpoint number. This packet is referred to as a "token packet." The USB device that is addressed selects itself by decoding the appropriate address fields. In a given transaction, data is transferred either from the host to a device or from a device to the host. The direction of data transfer is specified in the token packet. The source of the transaction then sends a data packet or indicates it has no data to transfer. The destination, in general, responds with a handshake packet indicating whether the transfer was successful.

The USB protocol may be used for transporting data through a pipe between a memory buffer associated with a software client on the host and an endpoint on the USB device using transfers. Four types of transfers are defined—control, isochronous, interrupt, and bulk. There are certain attributes for transfers of each type. Control transfers are bursty, non-periodic, host software-initiated request/response communication, typically used for command/status operations and carry USB Device Requests—commands, arranged in special structures defined in USB specification. A command can send data to a device (SET command), or request data from a device (GET command). The general format of USB Device Request can be further expanded by a public specification for a particular class of devices or by a proprietary vendor specification.

For USB, isochronous transfers are periodic, continuous communication between host and device, typically used for time-relevant information. This transfer type also preserves the concept of time encapsulated in the data. This does not imply, however, that the delivery requirement of such data is always time-critical. Interrupt transfers are low-frequency, bounded-latency. Bulk transfers are non-periodic large-packet bursty communication, typically used for data that can use any available bandwidth and can also be delayed until bandwidth is available. Isochronous, bulk and interrupt transfers can be executed to an endpoint on a device in one of two directions (IN or OUT). USB 2.0 introduces another optional layer for split transactions. The split transaction layer is used to bridge the high-speed host with classic-speed devices connected to the USB 2.0 hub by introducing special split token packets that can be sent only to the hub. Using these tokens, the host sets up classic speed transactions on the hub's classic downstream ports.

BLUETOOTH™ is a wireless technology for enabling low speed connectivity among closely spaced computers, telecommunication devices such as mobile phones, and consumer devices such as personal digital assistants and headphones. The BLUETOOTH™ standard provides for radio wave communication for up to 100 meters distance and up to one megabit per second among nets, termed piconets, having a master and up to seven slaves. The protocol specification for BLUETOOTH™ defines a comprehensive protocol stack with several layers on top of each other. In addition, several more protocol layers can be added on top of the defined ones by complementary or vendor-defined specifications.

InfiniBand™ enables high speed connectivity both inside computers and among computers and storage devices in storage area networks. InfiniBand™ operates at speeds of up to six gigabits per second over both copper wire for distances up to 10 meters and fiber optic cable for distances up to 10 kilometers. The protocol standard for InfiniBand™ is a layered architecture having a packet protocol and a transport protocol. The transport protocol is layered over the packet protocol for providing transport functions and operations using various types of InfiniBand™ packets.

Protocol analyzers are development tools designed for capturing communication traffic using specific protocol standards and then presenting a representation of the traffic on a display to a user. The user utilizes the display for debugging complex problems where one or another of the devices under test is misinterpreting the protocol. The problem can be happening at any one of the protocol layers. Because the problems are complex, the manner in which the communication is presented to the user becomes a very important issue.

The protocol analyzers that have been in use are less than ideal. Existing analyzers use a list view of a list-like textual display where each packet (unit) is presented as a line in the list. The line shows the fields of the packet in textual form. The lines of text on the list must be read in order to distinguish the difference between two packets on the display and for distinguishing the fields within a particular packet. Although reading a single line may not require much time, in practice the display often must be scrolled through many screens of lines of text thereby multiplying any small amount of time by a large number. Moreover, the more information you try to put into the display, the more crowded the screen gets, making it harder to read the lines or get a clear understand what is happening.

There is a need for a protocol analyzer having an improved presentation of protocol information. A first consideration is that one protocol element should be distinguishable from another one at a glance. A second consideration is that unneeded information should be easily removable so it doesn't clutter the display. A third consideration is that the display information should be easy to understand with little or no requirement for offline reading of the corresponding specification. A fourth consideration is that the relationship between the protocol layers and the way in which the upper layers are built from the units of lower layers should be clear. A fifth consideration is that the display should be flexible so that it can be customized. And, a sixth consideration is that errors and omissions in the protocol should be easy to recognize.

SUMMARY OF THE INVENTION

It is therefore an object of the present invention to provide a hierarchical display for levels of protocol units where a protocol unit represents communication data for an operation at a level of a multilevel protocol according to a specification standard for that protocol.

Briefly, in a preferred embodiment, the present invention is a method and an apparatus for displaying communication data transmitted according to a communication protocol standard having a plurality of protocol levels. The apparatus includes a receiver including a front end, a bus engine, and a display. The front end receives a sufficient length of communication data transmitted according to a first protocol of the communication protocol standard for completing an operation at an Nth, higher level, protocol of the communication protocol standard. The bus engine converts fields of the communication data into first text fields through Nth text fields according to the first through Nth protocols, respectively, of the standard and then associates each of the text fields with respective field descriptors according to the protocols for forming respective field cells. The field cells for the first through Nth protocol levels are organized into protocol units for each complete operation at that protocol level. The display displays the first through Nth protocol units simultaneously in a manner that shows hierarchy of the first through Nth levels.

Detailed specifications for field cells according to the protocol standard can be displayed by placing a selector over the field cell. Indicators in particular ones of the field cells allow certain field cells within a protocol unit to be collapsed or expanded within the protocol unit or allow lower protocol units to be collapsed or expanded into the higher protocol units.

BRIEF DESCRIPTION OF THE DRAWINGS

FIG. 3 is a generic illustration of a field cell displayed by the apparatus of the present invention;

FIGS. 4A and 4B are illustrations of exemplary first level protocol units displayed by the apparatus of the present invention;

DETAILED DESCRIPTION OF THE PREFERRED EMBODIMENTS

Figure 1A:
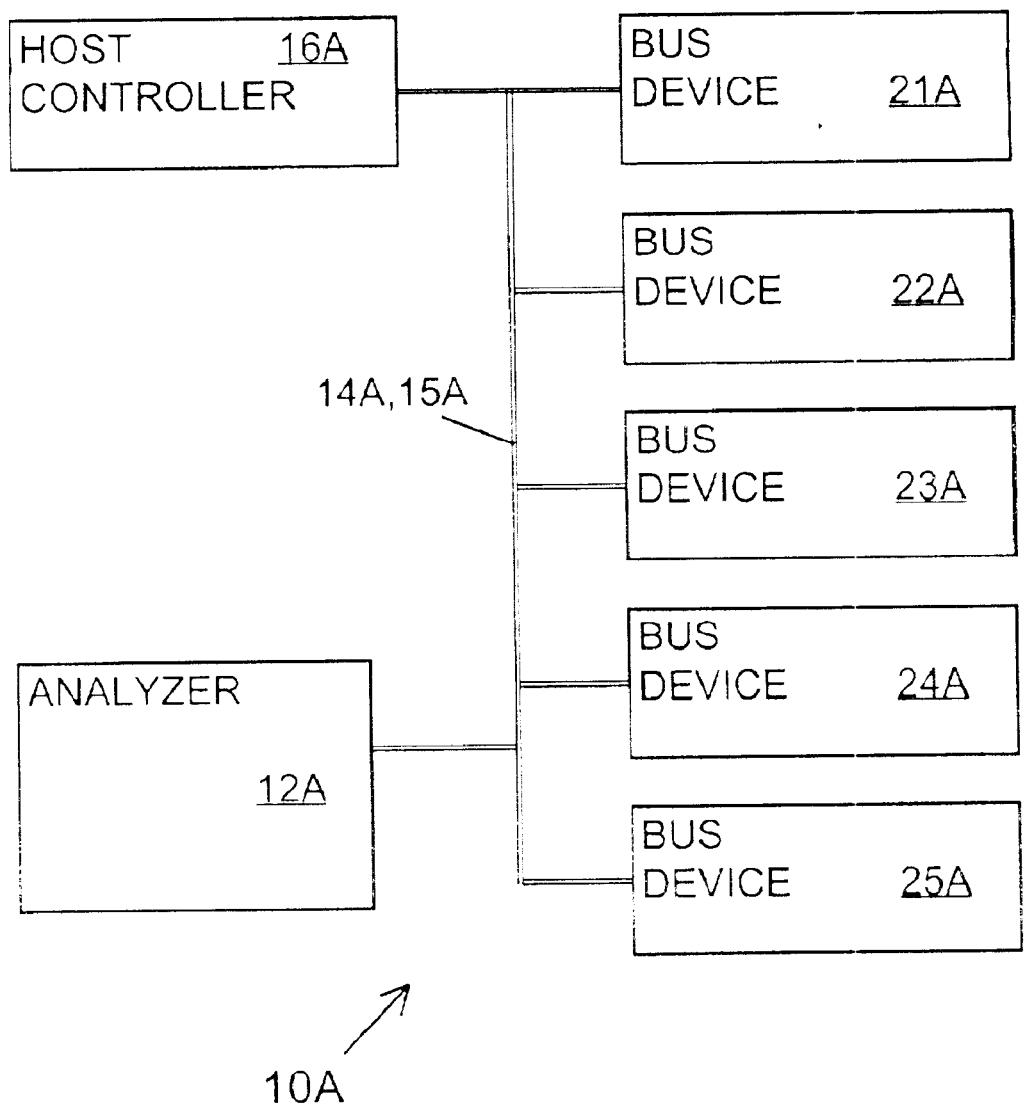
FIGS. 1A and 1B are block diagrams of wired and wireless system embodiments, respectively, of the present invention.
Figure 1B:
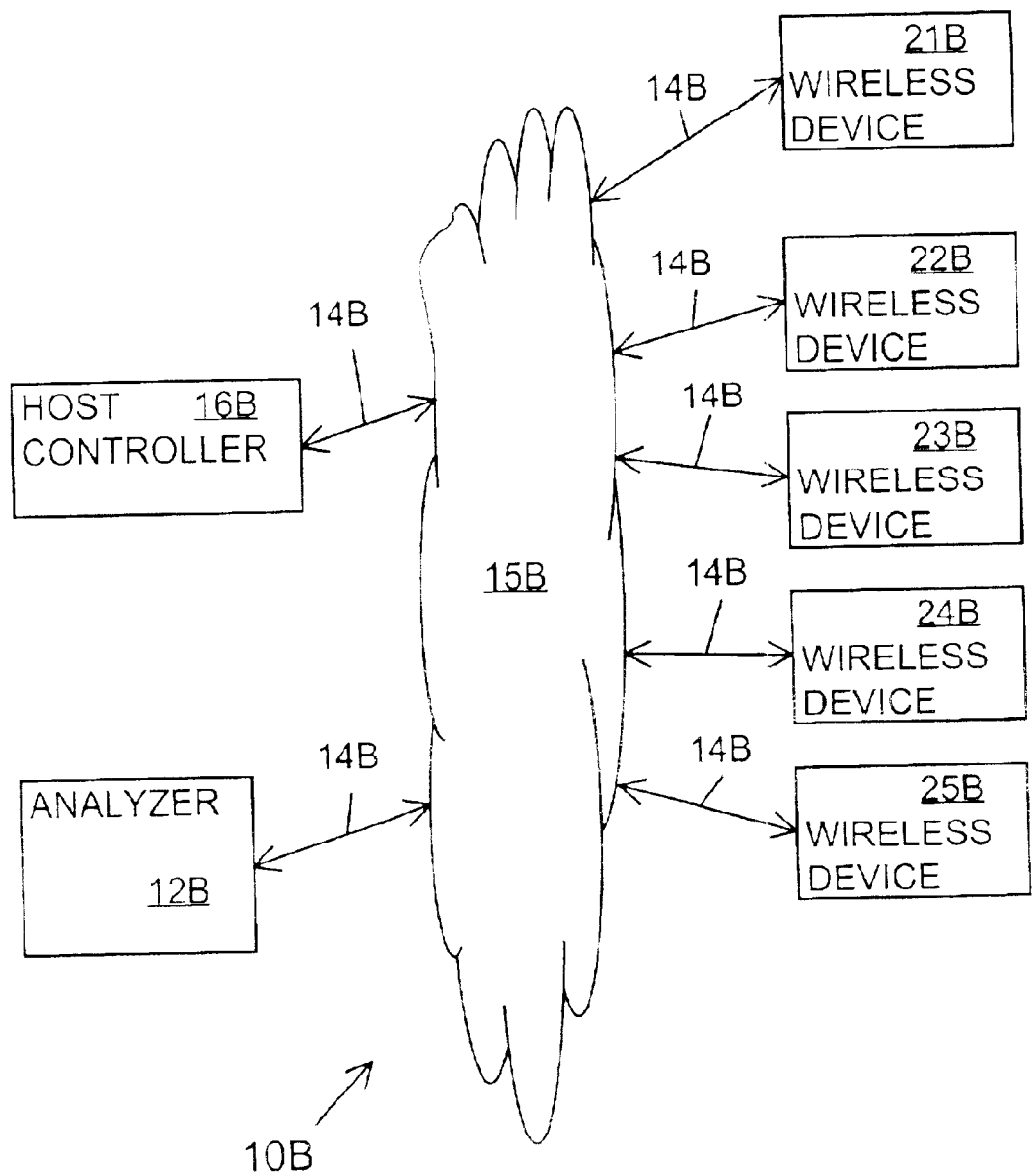

FIGS. 1A and 1B illustrate systems of the present invention referred to by general reference numbers 10A and 10B, respectively. The system 10A includes an analyzer 12A of the present invention adapted for receiving wired bus signals 14A having communication data that is formed according to a specified communication protocol standard. The signals 14A are carried on a wire bus 15A to and from a host controller 16A and bus devices 21A, 22A, 23A, 24A and 25A. Universal Serial Bus (USB) and InfiniBand™ are exemplary communication protocol standards for the signals 14A.

The system 10B includes an analyzer 12B of the present invention for receiving wireless signals 14B having communication data that is formed according to another specified communication protocol standard. The wireless signals 14B pass through the air 15B to and from a host controller 16B and wireless devices 21B, 22B, 23B, 24B and 25B. An exemplary communication protocol standard for the wireless signals 14B is BLUETOOTH™.

In order to simplify the description below, the analyzers 12A and 12B are both termed the analyzer 12 and the signals 14A and 14B are both termed the signals 14. It should be understood in the following description that the analyzer 12 can be either or both of the analyzer 12A or the analyzer 12B and the signals 14 can be either or both the wired signals 14A or the wireless signals 14B.

Figure 2:
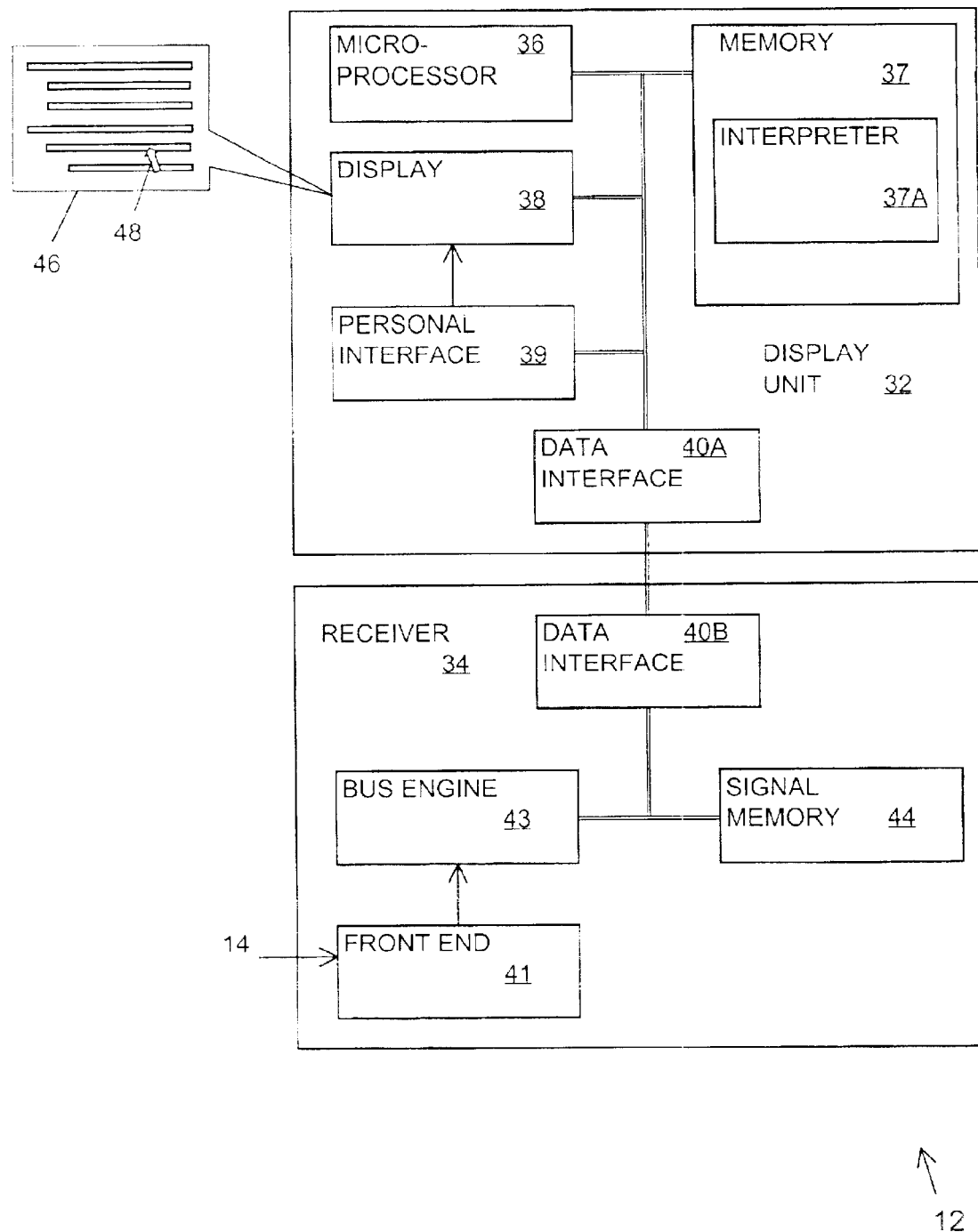
FIG. 2 is a block diagram of an apparatus of the present invention.

FIG. 2 is a block diagram of the analyzer of the present invention referred to by the reference number 12. The analyzer 12 includes a computing display unit 32 and a receiver 34. The display unit 32 includes a microprocessor 36, a memory 37 including an interpreter 37A, a display 38, a personal interface 39, and a data interface 40A. The memory 37 may include solid state memory chips for storing programmed instructions for directing the microprocessor 36 and a hard disk for storing data files. The microprocessor 36 operates in a conventional manner for reading instructions and data in the memory 37; writing data into the memory 37; receiving information from the personal interface 39 and data interface 40A; and issuing information to the display 38 and the data interface 40A. In a preferred embodiment, the display unit 32 is a personal computer.

The receiver 34 includes a data interface 40B, a front end 41, a bus engine 43, and a signal memory 44. The data interface 40B exchanges data with the data interface 40A. The front end 41 converts the signals 14 including the communication data into a local format for use within the receiver 34. The bus engine 43 stores the communication data in the signal memory 44. In a preferable embodiment, the bus engine 42 is a field programmable gate array (FPGA) configured as a state machine. However, other hardware implementations, or software under control of a microprocessor, or a combination of hardware and software can be used. At a later time the communication data is passed through the interfaces 40B and 40A into the display unit 32. The interpreter 37A includes programmed instructions for analyzing and interpreting the communication data for providing a hierarchical display presentation 46 as illustrated in FIGS. 3, 4A–B, 5A–C, 6A–B, 7A–C, 8A–B, and 9 and described in detail in the accompanying descriptions. The microprocessor 36 in the display unit 32 uses the instructions in the interpreter 37A for generating analysis signals carrying the interpreted and analyzed communication data to the display 38. Those of ordinary skill in electronic design will recognize that the interpreter 37A can also be implemented with hardware digital logic circuitry or a combination of digital logic hardware and software.

The analysis signals control the display 38 for issuing the display presentation 46 in a form that can be viewed by a human user. The display presentation 46 is representative of the communication data for the selected communication protocol standard in a convenient and understandable manner according the present invention as described below. The personal interface 39 enables a user to interact with the display 38 in order to show more or fewer details in the display presentation 46 with the use of a selector 48. In a preferred embodiment, the personal interface 39 includes a keyboard and a computer mouse. The mouse enables a user to control the location of the selector 48 in the form of a cursor on the display 38, the mouse having left and right keys for selecting items on the display presentation 46 that are approximately coincident with the cursor location.

FIG. 3 shows a fundamental cell of the display presentation 46 of the present invention termed a field cell and referred to generally with a reference number 50. Specific examples of the field cell 50 are identified by a reference identification having the number 50 followed by two letters. The field cell 50AA illustrated in FIG. 4A and described in the accompanying detailed description below is one example of the field cell 50. The field cell 50 includes a text field 52 and a field descriptor 54. The text field 52 is a number, a measurement, or an interpretation for a field or sequence of bits having a specific use specified by the protocol standard with which the communication data is transmitted. For a higher level protocol, the field may include information from several complete operations or units at a lower level protocol. A complete operation or unit at a protocol level includes the communication data that is necessary from a start to a finish at that protocol level according to the communication protocol standard for performing a specified task at that protocol level.

The field descriptor 54 gives an indicator of an attribute or use of the data or measurement of the associated text field 52. Typically, the field descriptor 54 is a mnemonic or caption whose meaning is recognizable or easily learned by a user of ordinary skill in the selected protocol standard.

The field descriptor 54 may have a background color to further enable the user to focus quickly on certain types for the text field 52. Normally, the background color of the text field 52 is a neutral color such as white. However, the text field 52 may also have a background color that is the same or different than the background color of the field descriptor 54. For example, the normal background color for one particular type for the field descriptor 54 may be yellow and for another particular type may be green. However, when the analyzer 12, detects an error in the field represented by the text field 52, the background color of the field descriptor 54 and/or the text field 52 in the associated field cell 50 may be red or some other especially distinctive color. A user can configure the display presentation 46 according to colors of his liking.

The display presentation 46 is organized as a set of protocol units referred to generally by reference numbers 56, 57, or 58. The general reference number 56 is used for USB protocol units, the general reference number 57 is used for BLUETOOTH™ protocol units, and the general reference number 58 is used for InfiniBand™ protocol units. However, it should be emphasized that the idea of the present invention may be applied to other multilevel protocols not limited to USB, BLUETOOTH™, and InfiniBand™. Specific examples of the general protocol units 56–58 are identified by a reference identifier having the number 56, 57, or 58 followed by a letter and a number. The latter number designates the protocol level of the protocol unit 56–58. For example the protocol unit 56A1 illustrated in FIG. 4A and described in the accompanying detailed description below is a unit for a first or packet level protocol for USB; and the protocol unit 56C2 illustrated in FIG. 5A and described in the accompanying detailed description is a unit for a second or transaction level protocol for USB.

The protocol unit 56–58 is a consecutive set of field cells 50 representing a complete operation at a designated level protocol. The display presentation 46 shows the protocol unit 56–58 on a single line with optional space separators and with the option to wrap around to the next line if all the field cells 50 do not fit on a single line. For example, at a second level protocol for USB, the protocol unit 56 represents the transmission of one or more packets at the first or packet level protocol. Among the field cells 50 that can be displayed in the protocol unit 56 for a USB packet are speed cells, synchronization (sync) cells, packet identifier field (PID) cells, address (addr) cells, endpoint cells, data cells, frame number cells, cyclic redundancy check (CRC) 5 cells, CRC 16 cells, and end of packet (EOP) cells. The optional space separators indicate changes between types of field cells 50. For example, in the FIG. 4A, the field cell 50FA having a descriptor 54 of "EOP" and a text field 52 of "7FFF" for an actual bit field is separated from the field cell 50GA having the descriptor 54 of "idle" and a text field 52 of "383 ns" for a measurement of time of 383 nanoseconds (ns) between the end of this packet and the beginning of the next packet. A user can configure the display presentation 46 so that individual types for the field cell 50 are hidden and can change the format of the text field 52 for individual types for the field cell 50.

USB, InfiniBand™, and BLUETOOTH™ have respective packet level protocols as first level protocols. For USB the second, third, and fourth level protocols are termed transaction, split transaction, and transfer protocols, respectively. For InfiniBand™ the second level protocol is termed a transport function protocol or (InfiniBand) IBA operation. BLUETOOTH™ has two second level protocols termed link manager protocol (LMP) message and logical link control, and adaptation protocol (L2CAP) message, respectively. The second level L2CAP message protocol is used in three third level protocols termed radio frequency communication (RFCOMM) protocol item, service discovery protocol (SDP) message, and telephony control (TCS) protocol item, respectively. The third level SDP message protocol is used in a fourth level protocol termed SDP transaction. The third level RFCOMM item protocol is used in two fourth level protocols termed object exchange (OBEX) protocol and high level data link control (HDLC) frame protocol, respectively. The fourth level HDLC frame protocol is used in a fifth level protocol termed a point-to-point (PPP) protocol.

The protocol unit 56–58 for the complete operation of the Nth level protocol can represent several complete operations at a protocol level of Nth minus one (N-1) or lower. For example, the protocol unit 56–58 for the second level protocol can represent several operations at a first level protocol; the protocol unit 56–58 for a third level can represent several operations at the second level protocol; the protocol unit 56–58 for a fourth level protocol can represent several operations at the third level protocol; and so on. Also the protocol unit 56–58 for a third level can represent several operations at a first level protocol; the protocol unit 56–58 for a fourth level protocol can represent several operations at a second level protocol or several operations at a first level protocol, and so on. The protocol unit 56–58 for each level protocol can be individually expanded (by selecting downward arrowhead 63, FIGS. 5A–B & 6A–B) or collapsed (by selecting upward arrowhead 64, FIG. 5C) using the personal interface 39 and selector 48 with the display presentation 46. The text field 52 for the first of the field cells 50 for each protocol unit 56–58 shows a sequential number for position of the protocol unit 56–58 for the same type of the protocol unit 56–58 within the trace or the time period that has been captured. The sequential numbers for an N-1 level protocol show consecutive numbers for the complete operations of the N-1 level protocol that can be represented as a single complete operation at an N level protocol. However, there may be a gap between the last sequential number of an N-1 level protocol unit 56–58 for a first operation at the N level protocol unit 56–58 and the first sequential number of the N-1 protocol unit 56–58 for a second later operation at the N level protocol unit 56–58 because there may be interspersed operations at the N-1 level protocol unit 56–58 that are not a part of the first or second N level protocol unit 56–58 that are displayed in the display presentation 46. The rest of the field cells 50 in the protocol unit 56–58 depend upon the type of the protocol unit 56–58.

FIGS. 4A and 4B show exemplary protocol units termed packet protocol units and referred to by reference numbers 56A1 and 57A1, respectively. In FIG. 4A the packet protocol unit 56A1 includes the field cells 50AA–50GA as an example of a packet transmitted according to the packet level protocol with the USB communication protocol standard. In FIG. 4B the packet protocol unit 57A1 includes the field cells 50AB–50RB as an example of a packet transmitted according to the packet level protocol with the BLUETOOTH™ communication protocol standard.

The packet protocol unit 56A1 having the field cells 50AA–50GA shows a complete operation for the first level protocol in USB for transmitting a packet. Table 1 describes the text field 52 and the caption for the field descriptor 54 for each of the field cells 50AA–50GA.

TABLE 1

| Field Cell | Text Field | Field Descriptor |
|---|---|---|
| 50AA | Packet number 565 | Position within capture |
| 50BA | H for High | S for Speed |
| 50CA | Hexadecimal number C3 | Packet header identifier |
| 50DA | 8 bytes in hexadecimal notation | Expanded Packet Data |
| 50EA | Hexadecimal number 6F96 | Cyclic Redundancy Check |
| 50FA | Hexadecimal number 7FFF | End of Packet |
| 50GA | 383 nanoseconds | Idle time between packets |

It should be noted that the text fields 52 in the field cells 50CA–50FA are numerical values for fields of communication data and the text fields 52 in the field cells 50AA, 50BA and 50GA are measurements on the communication data. Typically, the field descriptor 54 is positioned above the text field 52 in the field cell 50 in the display presentation 46. However, in the field cell 50BA the positions of the text field 52 (H for high) and the field descriptor 54 (S for speed) are reversed in order to be more easily understandable to mean high speed. In the field cell 50DA a new horizontal row is used for each 8 bytes. In general this can also be for each 16, 24, 32, and up numbers of bytes depending upon the total length of the data field. A left arrowhead 61 shown in the field descriptor 54 for the field cell 50DA indicates that the field cell 50DA is horizontally expanded in the display presentation 46 to show the actual packet data but can be selected by the user through the personal interface 39 to collapse the field cell 50DA when the user does not need to view the expanded data. After the data is collapsed, a right arrowhead 62 (as shown in the field cell 50DB in FIG. 4B) replaces the left arrowhead 61.

The packet protocol unit 57A1 having the field cells 50AB–50RB shows a complete operation for the first level protocol in BLUETOOTH™ for transmitting a packet. Table 2 describes the text field 52 and the caption for the field descriptor 54 for each of the field cells 50AB–50RB.

TABLE 2

| | Text Field | Field Descriptor |
|---|---|---|
| 50AB | Packet number 159 | Position of packet within capture |
| 50BB | M for Master | T for transmitted by |
| 50CB | 2477 MHz | Frequency Channel in MHz |

TABLE 2-continued

| Text Field | | Field Descriptor |
|---|---|---|
| 50DB | | Collapsed Channel Access Code |
| 50EB | | Expanded Header |
| 50FB | Hexadecimal number 7 | Address of recipient |
| 50GB | Hexadecimal number 3 | Type of Packet |
| 50HB | One | Flow Control Flag |
| 50IB | One | Acknowledgment Indication Flag |
| 50JB | Zero | Sequential Numbering Flag |
| 50KB | Hexadecimal number 5B | Header Error Check |
| 50LB | LM for link manager | Logical Channel |
| 50MB | One | Flow control flag |
| 50NB | Nine | Message length in bytes |
| 50OB | Starting at byte 0000 eight data bytes in hexadecimal Starting at byte 0008 one data byte in hexadecimal | Expanded Packet Data |
| 50PB | Hexadecimal number F70A | Cyclic Redundancy Check |
| 50QB | Yes | Acknowledged by recipient |
| 50RB | 333.9 microseconds | Idle time between packets |

The text fields 52 in the field cells 50FB–50KB and 50MB–50PB are numerical values for fields of communication data and the text fields 52 in the field cells 50AB–50CB, 50LB, 50QB, and 50RB are measurements on the communication data. The field cell 50DB and the field cell 50EB are headers, also called caption only field cells that are special cases for the field cell 50. The caption only type of the field cell 50 is a special category of the field descriptor 54 that is used for describing the type of field cells 50 that follow. For example, the field cell 50EB includes the special field descriptor "HDR" as an abbreviation for "header" to describe the field cells 50FB–50KB having the field descriptors 54 "Addr", "DM1", "Flow", "Arqn", "Seqn" and "HEC", respectively, that describe parts of the header.

The field cells 50DB and 50EB are examples of field cells 50 that are caption only field cells. The caption only type of the field cell 50 acts as a place holder for enabling the user to expand or collapse one or more field cells 50 that give a more complete analysis of the associated caption only type of the field cell 50. The left arrowhead 61 in the caption only field cell 50EB indicates that the cell field 50EB is horizontally expanded in the display presentation 46 to show the field cells 50FB–50KB, but can be collapsed by the user when the user does not need to view the expanded header. The left arrowhead 61 in the caption only field cell 50OB indicates that the field cell 50OB for the data is expanded on the display presentation 46, but can be collapsed by the user when the user does not need to view the byte-by-byte data. A right arrowhead 62 in the caption only field cell 50DB indicates that the field cell 50DB is horizontally collapsed in the display presentation 46 but can be expanded through the personal interface 39 by the user when the user needs to view the channel access code. After the data is expanded, the left arrowhead 61 replaces the right arrowhead 62.

For some protocol analysis, it is simpler and easier to understand the display presentation 46 when a header, such as the field cell 50DB and 50EB, is collapsed into one field cell 50. However, the header can be expanded when necessary with the personal interface 39 to show the embedded structure. Preferably the personal interface 39 uses a mouse for controlling the location of the selector 48 to the right arrowhead 62 on the display presentation 46 for expanding the header and to the left arrowhead 61 for collapsing the header. Header expanding and collapsing can also be done by double-clicking anywhere in the caption only type of the field cell 50. Alternatively, single clicking on the caption only type of field cell 50 brings up a pop-up window (FIG. 9) having expand and collapse menu items.

Figure 5A:
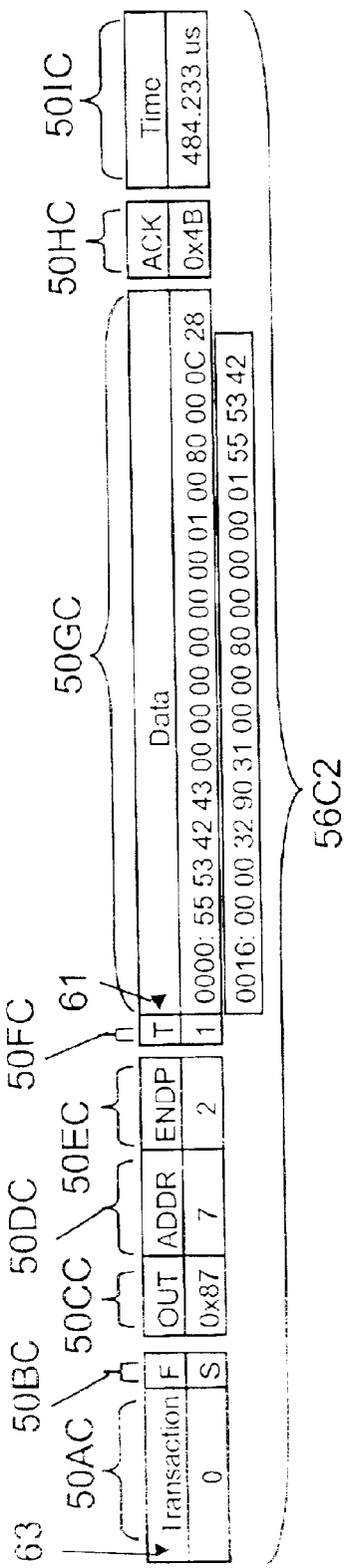
FIGS. 5A and 5B are illustrations of exemplary second level protocol units in collapsed state as displayed by the apparatus of the present invention.
Figure 5B:
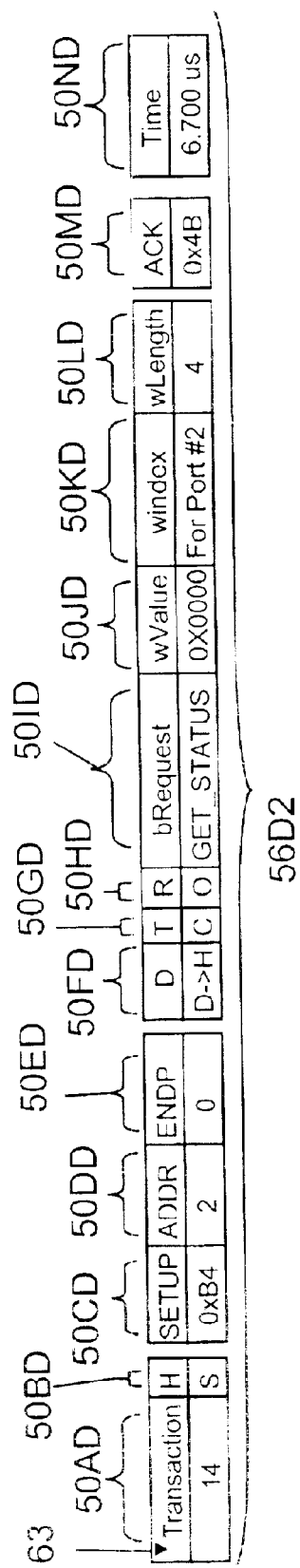

FIGS. 5A and 5B show exemplary second level protocol units termed transaction protocol units and referred to by reference numbers 56C2 and 56D2, respectively, transmitted according to the second level protocol with the USB communication protocol standard. The transaction protocol units 56C2 and 56D2 include the field cells 50AC–50IC and the field cells 50AD–50ND, respectively. Each of the protocol units 56C2 and 56D2 represents several complete operations according to the first or packet level protocol with the USB communication protocol standard. The left arrowhead 61 in the field cell 50GC means that the associated text field 52 for the data is expanded in the display presentation 46, but can be collapsed by the user when the user does not need to view the byte-by-byte data. Downward arrowheads 63 in the field cells 50AC and 50AD indicate that the user has chosen not to display (vertically collapsed) the one or more packet protocol units 56 of the type exemplified by the packet protocol units 56A1. The packet protocol units 56 can be displayed (vertically expanded) on the display presentation 46 by the user through the personal interface 39. When the protocol unit 56–58 includes the downward arrowhead 63, the display presentation 46 may include a drawing showing information about the lower level protocol units 56–58 that are hidden and/or one or more numbers showing how many of the lower level protocol units 56–58 are hidden. For example, the protocol unit 56D2 might include a drawing showing a hidden hierarchy. When the display presentation 46 is expanded, an upward arrowhead 64 (shown in FIG. 5C) replaces the downward arrowhead 63.

At a second level protocol, the protocol unit 56–58 can represent several packets. In exemplary systems for USB and BLUETOOTH™ the second level protocol is termed a "transaction" and a "message", respectively. Five types of transactions that can be displayed for USB are SETUP, IN, OUT, PING, and SPLIT. The IN, OUT, and PING transactions start with a transaction PID and then have address and endpoint fields, an optional data sequence indicator and a data field, and an optional handshake field. The SETUP transaction is different as it always carries eight bytes of data which are defined by the USB specification to have a special USB device request format. In the SETUP transaction the field cells 50 with field descriptors 54 represented by bRequest, wValue and wIndex can be further decoded depending upon the decoding setup for the trace.

Figure 5C:
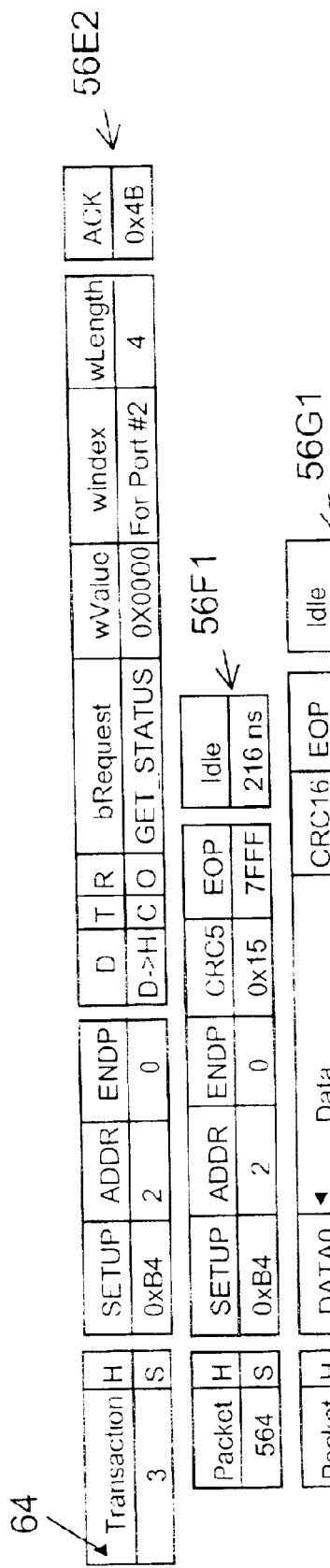
FIG. 5C is an illustration of an exemplary second level protocol unit in expanded state as displayed by the apparatus of the present invention.

FIG. 5C shows an exemplary second level protocol unit 56 termed a transaction protocol unit referred to by a reference identifier 56E2. An upward arrowhead 64 indicates that the second level protocol unit 56E2 is vertically expanded to show first level protocol units 56F1, 56G1, and 56H1 that compose the second level protocol unit 56E2. The selector 48 enables a user to toggle between an expanded state indicated with the upward arrowhead 64 and a collapsed state indicated with the downward arrowhead 63. In order to make the display presentation 46 easier to understand the lower level protocol units 56F1–56H1 may be indented with respect to the higher level protocol unit 56E2.

Figure 6A:
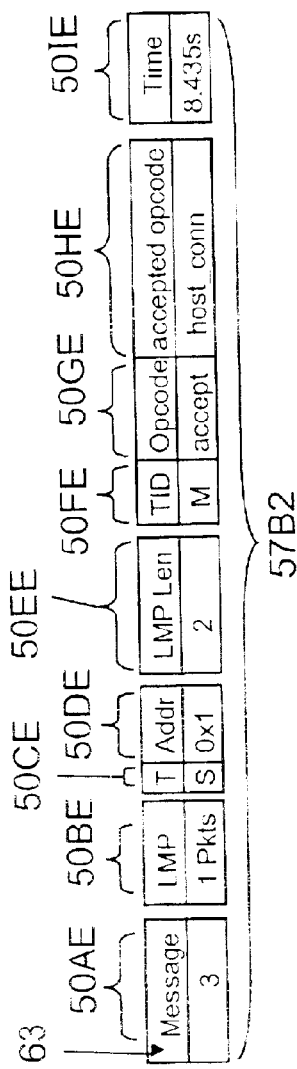
FIGS. 6A and 6B are further illustrations of exemplary second level protocol units displayed by the apparatus of the present invention.
Figure 6B:
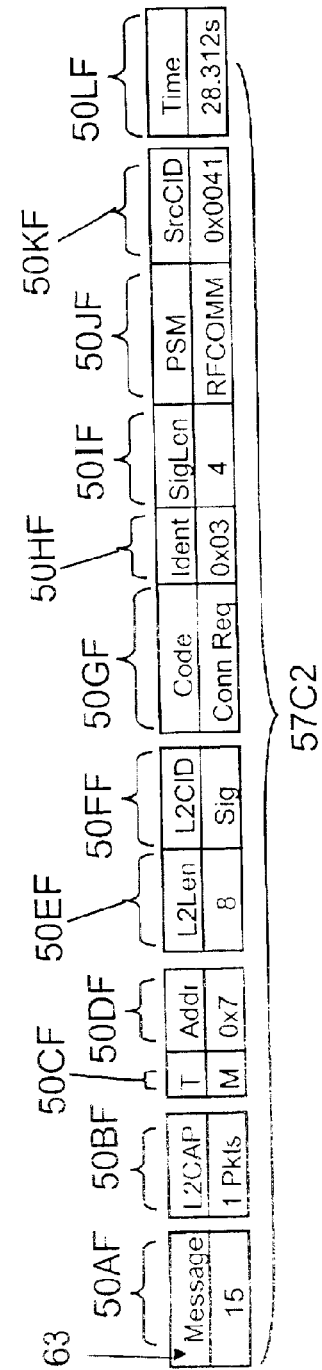

FIGS. 6A and 6B show exemplary second level protocol units termed message protocol units and referred to by reference numbers 57B2 and 57C2, respectively, transmitted according to the second level protocol with the BLUETOOTH™ communication protocol standard. The message protocol units 57B2 and 57C2 include the field cells 50AE–50IE and 50AF–50LF, respectively. Each of the protocol units 57B2 and 57C2 represents several complete operations according to the first or packet level protocol with the BLUETOOTH™ communication protocol standard. The downward arrowheads 63 in the field cells 50AE and 50AF indicate that one or more packet protocol units of the type exemplified by the packet protocol unit 57A1 are available to be displayed but are not currently being displayed.

Figure 7A:
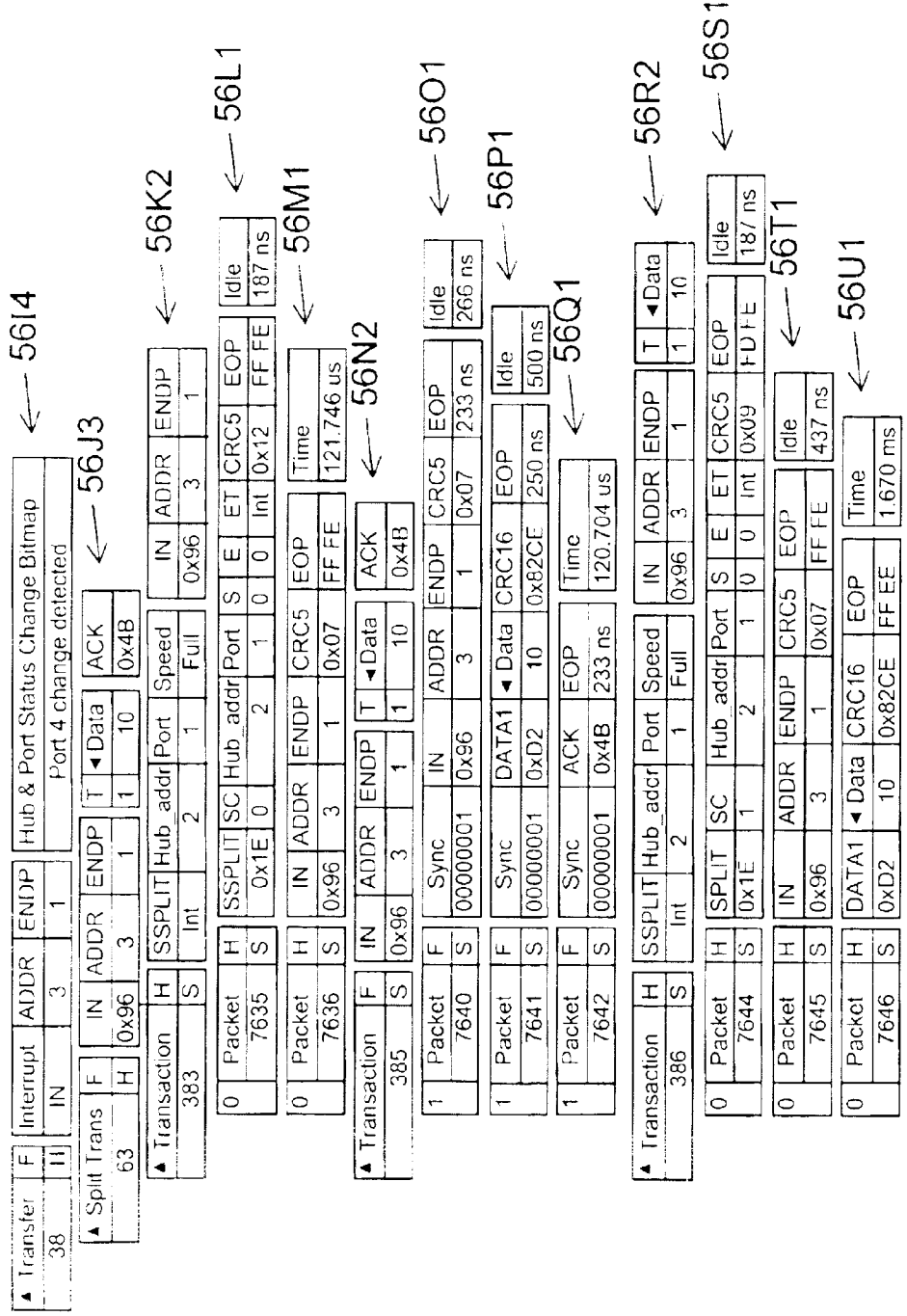
FIG. 7A is an illustration of a hierarchical display presentation of the present invention including first, second, third, and fourth level protocol units for a Universal Serial Bus as displayed by the apparatus of the present invention.
Figure 7B:
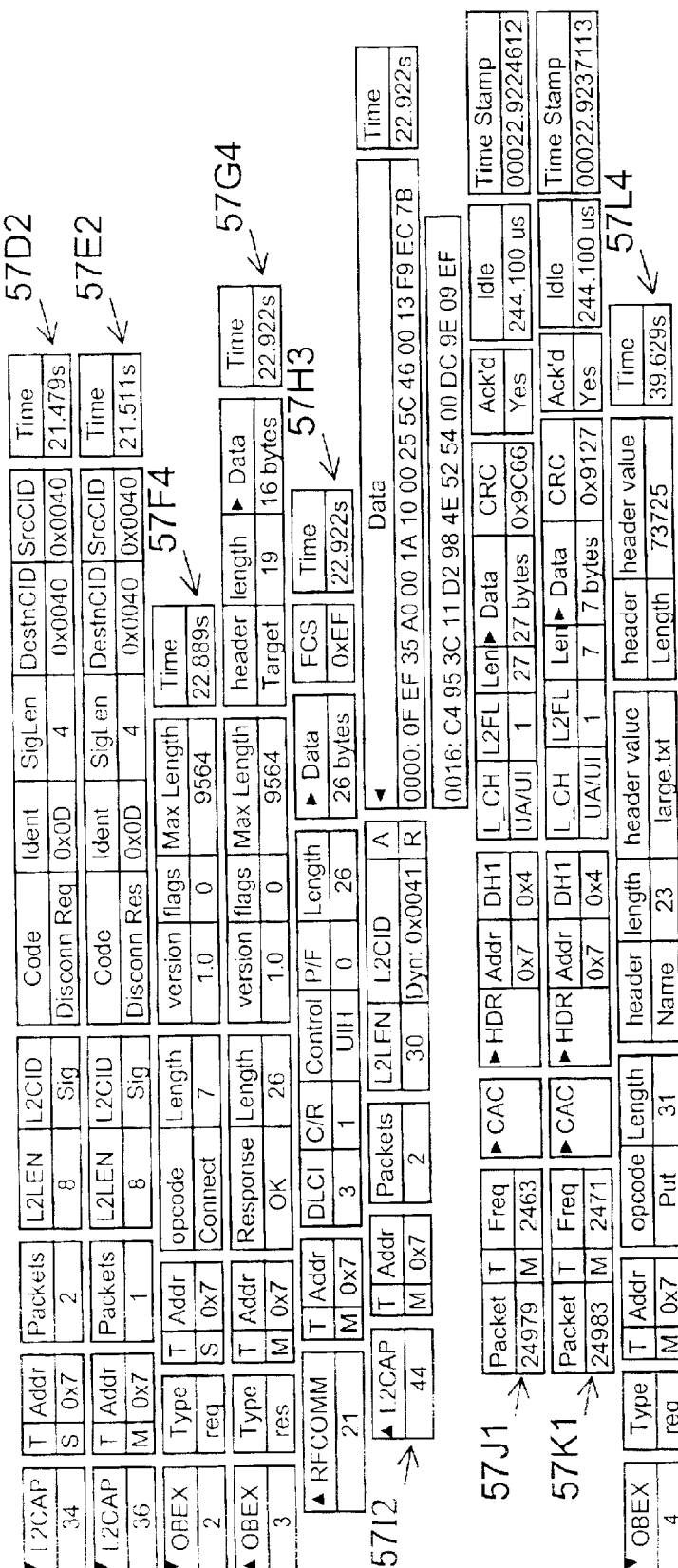
FIG. 7B is an illustration of a hierarchical display presentation of the present invention including first, second, third, and fourth level protocol units for a BLUETOOTH™ system as displayed by the apparatus of the present invention.
Figure 7C:
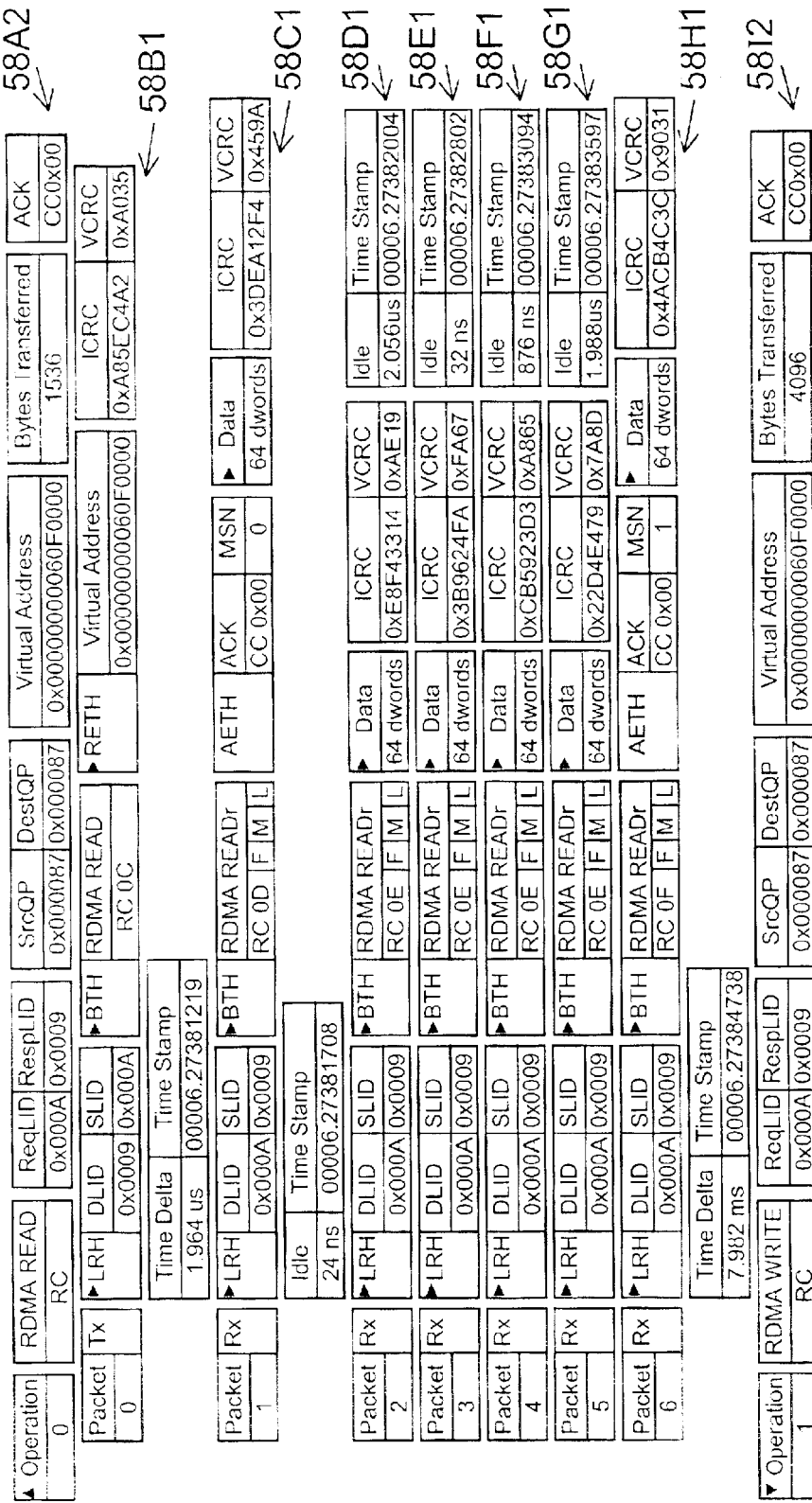
FIG. 7C is an illustration of a hierarchical display presentation of the present invention including first and second level protocol units for an InfiniBand™ system as displayed by the apparatus of the present invention.

FIGS. 7A, 7B, and 7C show examples of the hierarchical display presentation 46 referred to by reference identifiers 46A, 46B, and 46C, respectively. Referring to FIG. 7A, the display presentation 46A is illustrated in terms of the USB communication protocol standard. The display presentation 46A includes a fourth level or transfer protocol unit 56I4. The transfer protocol unit 56I4 is expanded to include a third level or split transaction protocol unit 56J3 shown in the display presentation 46A beneath and indented from the transfer protocol unit 56I4. The split transaction protocol unit 56J3 is expanded to include three second level or transaction protocol units 56K2, 56N2 and 56R2. The transaction protocol units 56K2, 56N2 and 56R2 are beneath and indented from the split transaction protocol 56J3 in the hierarchical presentation 46A. The transaction protocol unit 56K2 is expanded to include two first level or packet protocol units 56L1 and 56M1 beneath and indented from the transaction protocol unit 56K2. The transaction protocol unit 56N2 is expanded to include three first level or packet protocol units 56O1, 56P1 and 56Q1 beneath and indented from the transaction protocol unit 56N2. The transaction protocol unit 56R2 is expanded to include three first level or packet protocol units 56S1, 56T1 and 56U1 beneath and indented from the transaction protocol unit 56R2.

Referring to FIG. 7B, the display presentation 46B is illustrated in terms of the BLUETOOTH™ communication protocol standard. The display presentation 46B includes L2CAP message or second level protocol units 57D2 and 57E2, and object exchange (OBEX) or fourth level protocol units 57F4, 57G4, and 57L4. The packet or first level protocol units 57 that are completed within the second level protocol units 57D2 and 57E2 are collapsed. All the lower level protocol units 57 that are completed within the fourth level protocol units 57F4 and 57L4 are collapsed. The fourth level protocol unit 57G4 is expanded to include a third level protocol unit 57H3 shown in the display presentation 46B beneath and indented from the transfer protocol unit 57G4. The third level protocol unit 57H3 is expanded to includes an L2CAP message or second level protocol unit 57I2. The second level protocol unit 57I2 is expanded to include packet or first level protocol units 57J1 and 57K1 beneath and indented from the second level protocol 57I3 in the display presentation 46B. All of the lower level protocol units 57 that are completed within an object exchange (OBEX) or fourth level protocol unit 57L4 are collapsed.

Referring to FIG. 7C, the display presentation 46C is illustrated in terms of the InfiniBand™ communication protocol standard. The display presentation 46C includes operation or second level protocol units 58A2 and 58I2. The second level protocol unit 58A2 is expanded to include first level protocol units 58B1, 58C1, 58D1, 58E1, 58F1, 58G1, and 58H1. The protocol units 58B1–58H1 are shown in the display presentation 46C beneath and indented from the second level protocol unit 58A2 in the display presentation 46C. The protocol units 58B1, 58C1, and 58H1 are wrapped around to second rows.

Figure 8A:
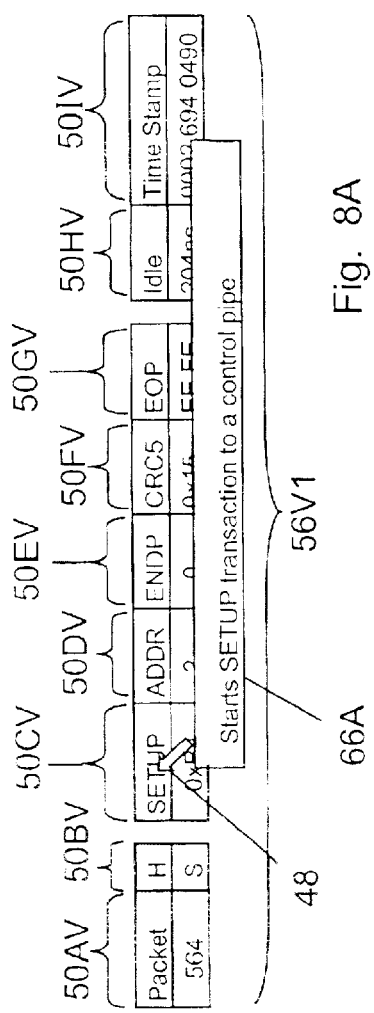
FIGS. 8A and 8B are illustrations of exemplary tool tip windows displayed by the apparatus of the present invention.
Figure 8B:
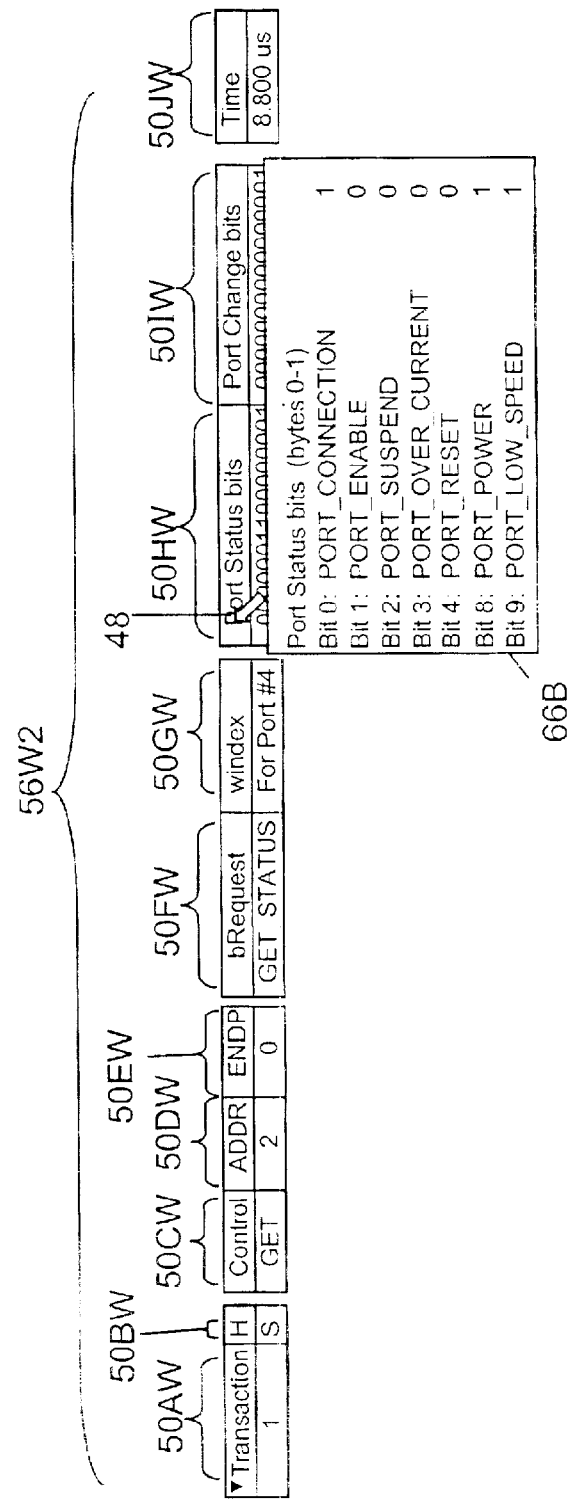

FIGS. 8A and 8B illustrate examples of a tool tip window of the present invention referred to in general by a reference number 66 and in specific examples by a reference identifier of 66 followed by a letter. The tool tip window 66 provides additional information for the particular field descriptor 54 over which the selector 48 is placed on the display presentation 46. In FIG. 8A a first level protocol unit 56V1 includes field cells 50AV to 50IV. The selector 48 is placed over the field cell 50CV having the field descriptor 54 of a caption mnemonic caption "SETUP". A tool tip window 66A provides additional information about the attributes represented by the caption "SETUP" in the USB communication protocol standard. The information in the tool tip window 66A can be text taken directly from a published specification of the USB communication protocol standard. FIG. 8B a transaction or second level protocol 56W2 includes field cells 50AW to 50JW. The selector 48 is placed over the field cell 50HW having the field descriptor 54 of a caption mnemonic caption "Port Status bits". A tool tip window 66B provides additional information about the attributes represented by the caption "Port Status bits" in the USB communication protocol standard. The information in the text in the tool tip window 66B provides further decoding for the field cell 50HW that could not fit in a simple and understandable overview of the transfer protocol unit 56W2.

Figure 9:
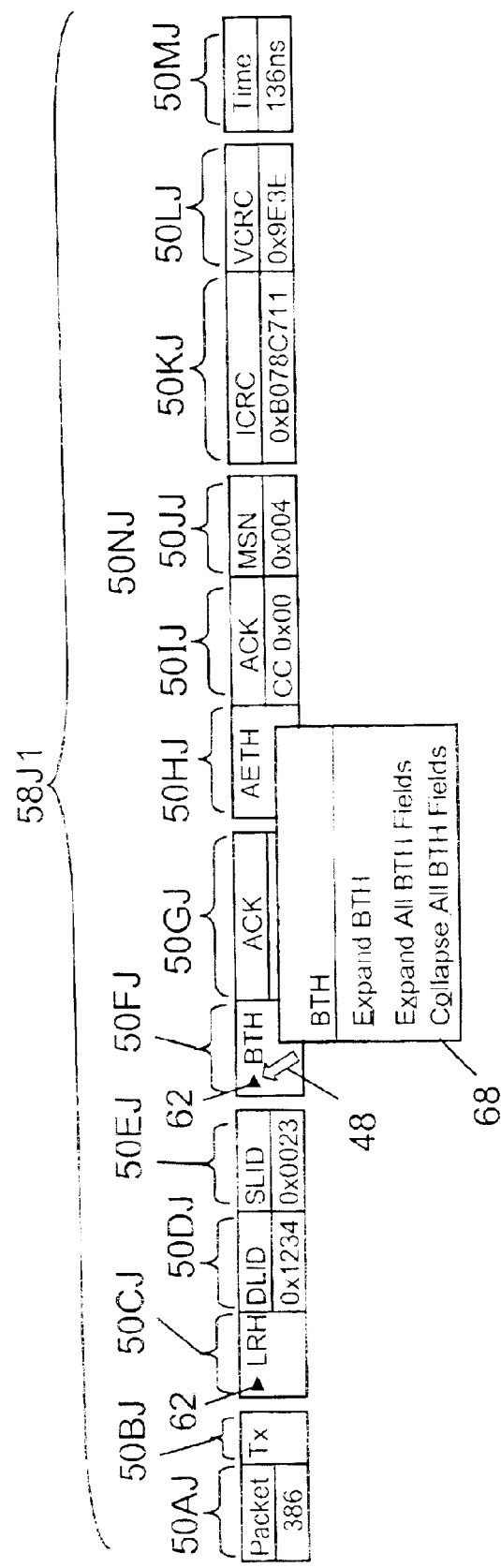
FIG. 9 is an illustration of an exemplary pop-up menu displayed by the apparatus of the present invention.

FIG. 9 illustrates a packet or first level protocol unit 58J1 for the InfiniBand™ protocol including the field cells 50AJ to 50MJ. A pop-up menu 68 is associated with the special case of the field cell 50, described above as a caption only type of the field cell 50, referred to here as the field cell 50FJ, that is used to designate a header within the protocol unit 58. Typically the header includes an embedded structure having a consecutive set of field cells 50 each of which includes a text field 52 and a field descriptor 54. The right arrowhead 62 in the field cell 50FJ indicates that the header structure in the field cell 50FJ is collapsed. A pop-up menu 68 shows a menu of choices associated with the header field cell 50FJ. In the example in FIG. 9, the pop-up menu 68 shows a menu associated with the field cell 50FJ for an InfiniBand™ BTH header for a packet protocol unit 58J1 for expanding and collapsing the BTH header. A user can use the selector 48 with the personal interface 39 and the pop-up menu 68 for selecting to expand all the BTH headers in the display presentation 46 or only the BTH header in the selected protocol unit 58J1. Many types of the field cell 50 and not just the special case of the field cell 50 for caption only can have pop-up menus for other purposes and enabling a user to perform various functions.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for displaying communication data transmitted according to a communication protocol standard, comprising:

receiving one or more first protocol units of said communication data transmitted according to a first protocol level of said communication protocol standard for completing a second protocol unit at a second protocol level of said communication protocol standard;

converting said first protocol unit into first text fields according to said first protocol level and converting said second protocol unit into second text fields according to said second protocol level;

associating said first text fields with respective first field descriptors on a one-to-one basis according to said first protocol level for forming respective first field cells and associating said second text fields with respective second field descriptors on a one-to-one basis according to said second protocol level for forming respective second field cells; and displaying said second protocol unit having said second field cells in a hierarchical manner with respect to said one or more first protocol units having said first field cells.

2. The method of claim 1, wherein:
said one or more first protocol units represent packets in said communication protocol standard.

3. The method of claim 2, wherein:
said second protocol unit represents said one or more first protocol units at said second protocol level.

4. The method of claim 1, wherein:
displaying said first and second field cells includes: displaying said first protocol units in a horizontal manner having said first field descriptors disposed above said associated first text fields, respectively, as identifiable cells; and displaying said second protocol unit in a horizontal manner having said second field descriptors disposed above said associated second text fields, respectively, as identifiable cells.

5. The method of claim 1, further comprising:
selecting an indicator associated with said second protocol unit for toggling between an expanded display state for showing said one or more first protocol units and a collapsed display state for hiding said one or more first protocol units.

6. The method of claim 1, further comprising:
selecting a one of said field cells within a corresponding said protocol unit for toggling between a collapsed display state and an expanded display state; wherein said expanded display state shows certain ones of said field cells within said corresponding protocol unit and said collapsed display state hides said certain ones of said field cells.

7. The method of claim 1, further comprising:
selecting one of said field cells; and
displaying additional descriptive information from said protocol standard for said selected one of said field cells.

8. The method of claim 1, further comprising:
selecting a particular one of said field cells for displaying a menu of user options associated with said particular field cell.

9. The method of claim 1, further comprising:
receiving further said first protocol units for one or more (Nth−1) protocol units of said communication data transmitted according to an (Nth−1) protocol level of said communication protocol standard for completing an Nth protocol unit at an Nth protocol level of said communication protocol standard;

converting said (Nth−1) protocol unit into (Nth−1) text fields according to an (Nth−1) protocol level and converting said Nth protocol unit into Nth text fields according to said Nth protocol level;

associating said (Nth−1) text fields with respective (Nth−1) field descriptors according to said (Nth−1) protocol level for forming respective (Nth−1) field cells and associating said Nth text fields with respective Nth field descriptors according to said Nth protocol level for forming respective Nth field cells; and displaying said Nth protocol unit having said Nth field cells in a hierarchical manner with respect to said one or more (Nth−1) protocol units having said (Nth−1) field cells.

10. The method of claim 1, wherein:
said first text fields are one of a number, a measurement, or an interpretation representative of a sequence of bits having specific meanings at said first protocol level specified by said communication protocol standard; and said first field descriptors are captions respectively indicative of said first protocol level meanings of said first text fields.

11. The method of claim 1, wherein:
said second text fields are one of a number, a measurement, or an interpretation representative of one or more sequences of bits for said one or more first protocol units having specific attributes at said second protocol level; and said second field descriptors are captions respectively indicative of said second protocol level attributes of said one or more sequences of bits.

12. The method of claim 1, wherein:
said first and second field descriptors use colors for representing said first and second field descriptors.

13. An apparatus for displaying communication information transmitted according to a communication protocol standard, comprising:

a receiver for receiving one or more first protocol units of said communication data transmitted according to a first protocol level of said communication protocol standard for completing a second protocol unit at a second protocol level of said communication protocol standard;

an interpreter for converting each said first protocol unit into first text fields according to said first protocol level and converting said second protocol unit into second text fields according to said second protocol level, and associating said first text fields on a one-to-one basis with respective first field descriptors according to said first protocol level for forming respective first field cells and associating said second text fields on a one-to-one basis with respective second field descriptors according to said second protocol level for forming respective second field cells; and a display for presenting said second protocol unit having said second field cells in a hierarchical manner with respect to said one or more first protocol units having said first field cells.

14. The apparatus of claim 13, wherein:
said one or more first protocol units represent packets in said communication protocol standard.

15. The apparatus of claim 14, wherein:
said second protocol unit represents said one or more first protocol units at said second protocol level.

16. The apparatus of claim 13, wherein:
the display presents said first protocol units in a horizontal manner having said first field descriptors disposed above said associated first text fields, respectively, as identifiable cells; and presents said second protocol unit in a horizontal manner having said second field descriptors disposed above said associated second text fields, respectively, as identifiable cells.

17. The apparatus of claim 13, wherein:
said second protocol unit includes an indicator having a first indication for indicating a collapsed display state and a second indication for indicating an expanded display state; and the display includes an interface coupled to said indicator toggling between said collapsed display state and said expanded display state; wherein said expanded display state shows said one or more first protocol units and said collapsed display state hides said one or more first protocol units.

18. The apparatus of claim 16, wherein:

a particular one of said field cells within a corresponding said protocol unit includes an indicator having a first indication for indicating a collapsed display state and a second indication for indicating an expanded display state; and the display includes an interface coupled to said indicator for toggling between said collapsed display state and said expanded display state; wherein said expanded display state shows certain ones of said field cells within said corresponding protocol unit and said collapsed display state hides said certain ones of said field cells.

19. The apparatus of claim 13, further comprising:

a selector coupled to the display for selecting a particular one of said field cells; and wherein:

the display presents additional descriptive information from said protocol standard for said particular field cell when said particular field cell is selected.

20. The apparatus of claim 13, further comprising:

a selector coupled to the display for selecting a particular one of said field cells; and wherein:

the display presents a menu of user options associated with said particular field cell when said particular field cell is selected.

21. The apparatus of claim 13, wherein:

the receiver receives further said first protocol units for one or more (Nth−1) protocol units of said communication data transmitted according an (Nth−1) protocol level of said communication protocol standard for completing an Nth protocol unit at an Nth protocol level of said communication protocol standard; interpreter converts said (Nth−1) protocol unit into (Nth−1) text fields according to an (Nth−1) protocol level and converts said Nth protocol unit into Nth text fields according to said Nth protocol level; associates said (Nth−1) text fields with respective (Nth−1) field descriptors according to said (Nth−1) protocol level for forming respective (Nth−1) field cells and associates said Nth text fields with respective Nth field descriptors according to said Nth protocol level for forming respective Nth field cells; and the display displays said Nth protocol unit having said Nth field cells in a hierarchical manner with respect to said one or more (Nth−1) protocol units having said (Nth−1) field cells.

22. The apparatus of claim 13, wherein:

said first text fields are one of a number, a measurement, or an interpretation representative of a sequence of bits having a specific meanings at said first protocol level specified by said communication protocol standard; and said first field descriptors are captions respectively indicative of said first protocol level meanings of said first text fields.

23. The apparatus of claim 13, further comprising:

said second text fields are one of a number, a measurement, or an interpretation representative of one or more sequences of bits for said one or more first protocol units having specific attributes at said second protocol level; and said second field descriptors are captions respectively indicative of second protocol level attributes of said one or more sequences of bits.

24. The apparatus of claim 13, wherein:

said first and second field descriptors use colors for representing said first and second field descriptors.

* * * * *